(12) United States Patent
Bauters et al.

(10) Patent No.: US 10,151,883 B2
(45) Date of Patent: Dec. 11, 2018

(54) OPTICAL COUPLING DEVICE AND METHOD

(71) Applicant: Juniper Networks, Inc., Sunnyvale, CA (US)

(72) Inventors: Jared Bauters, Santa Barbara, CA (US); Jonathan Edgar Roth, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/604,603

(22) Filed: May 24, 2017

(65) Prior Publication Data

US 2017/0343739 A1 Nov. 30, 2017

Related U.S. Application Data

(60) Provisional application No. 62/341,195, filed on May 25, 2016.

(51) Int. Cl.
  *G02B 6/27* (2006.01)
  *G02B 6/34* (2006.01)
  (Continued)

(52) U.S. Cl.
  CPC ............... *G02B 6/34* (2013.01); *G02B 6/27* (2013.01); *G02B 6/2706* (2013.01);
  (Continued)

(58) Field of Classification Search
  None
  See application file for complete search history.

(56) References Cited

U.S. PATENT DOCUMENTS

| 6,014,254 A | 1/2000 | Cheng | |
|---|---|---|---|
| 2016/0294155 A1* | 10/2016 | Zheng | H01S 5/0228 |
| 2016/0377811 A1* | 12/2016 | Goodwill | G02B 6/2706 |
| | | | 385/24 |

FOREIGN PATENT DOCUMENTS

| EP | 1176451 | 1/2002 | |
|---|---|---|---|
| EP | 1176451 A2 * | 1/2002 | G02B 6/272 |

(Continued)

OTHER PUBLICATIONS

"International Application Serial No. PCT/US2017/034346, International Search Report dated Aug. 24, 2017", 6 pgs.

(Continued)

*Primary Examiner* — Michelle R Connelly

(74) *Attorney, Agent, or Firm* — Schwegman Lundberg & Woessner, P.A.

(57) ABSTRACT

An optical coupling device can include a first birefringent layer having opposing first and second surfaces. The first birefringent layer can split incident light received at the first surface into first and second beams. The first and second beams can have respective polarization orientations that are orthogonal to each other. The first birefringent layer can propagate the first and second beams along respective first and second paths within the first birefringent layer to the second surface. The first and second beams can be spatially separated at the second surface. A redirection layer facing the second surface of the first birefringent layer can include first and second grating couplers configured to respectively redirect the first and second beams to propagate within the redirection layer as respective third and fourth beams. In some examples, the third and fourth beams can have respective polarization orientations that are parallel to each other.

20 Claims, 7 Drawing Sheets

(51) Int. Cl.
*G02B 6/42* (2006.01)
*G02B 6/30* (2006.01)

(52) U.S. Cl.
CPC ......... *G02B 6/2746* (2013.01); *G02B 6/2766* (2013.01); *G02B 6/2793* (2013.01); *G02B 6/30* (2013.01); *G02B 6/4209* (2013.01); *G02B 6/272* (2013.01); *G02B 6/2773* (2013.01); *G02B 6/4213* (2013.01); *G02B 6/4214* (2013.01)

(56) References Cited

FOREIGN PATENT DOCUMENTS

| | | | |
|---|---|---|---|
| WO | 2015032095 | 3/2015 | |
| WO | WO 2015032095 A1 * | 3/2015 | ............... G02B 6/30 |
| WO | 2016184301 | 11/2016 | |
| WO | 2016206537 | 12/2016 | |
| WO | 2017205553 | 11/2017 | |

OTHER PUBLICATIONS

"International Application Serial No. PCT/US2017/034346, Written Opinion dated Aug. 24, 2017", 8 pgs.

* cited by examiner

OPTICAL COUPLING DEVICE AND METHOD

CROSS-REFERENCE TO RELATED APPLICATION

This application claims the benefit of U.S. Provisional Application No. 62/341,195, filed May 25, 2016, which is incorporated by reference herein in its entirety.

TECHNICAL FIELD

The present disclosure relates to polarization-sensitive optical components.

BACKGROUND

A photonic integrated circuit can receive light from an off-chip light source. In some cases, the received light can have a polarization state that varies unpredictably over time. It is desirable to account for polarization of the received light in a manner that reduces the effect of the polarization variation.

BRIEF DESCRIPTION OF THE DRAWINGS

In the following detailed description of example embodiments of the invention, reference is made to the accompanying drawings which form a part hereof, and which is shown by way of illustration only, specific embodiments in which the invention may be practiced. It is to be understood that other embodiments may be utilized and structural changes may be made without departing from the scope of the present invention.

Corresponding reference characters indicate corresponding parts throughout the several views. Elements in the drawings are not necessarily drawn to scale. The configurations shown in the drawings are merely examples, and should not be construed as limiting the scope of the invention in any manner.

DETAILED DESCRIPTION

An optical coupling device can receive light from an off-chip light source, split the received light into separate beams having orthogonal polarization states, and couple the separate beams into respective waveguides. The optical coupling device can use a geometry that orients the polarization states of the separate beams to be coplanar. When coupled into the waveguides, the separate beams can have the same polarization state, such as TE or TM.

The waveguides can direct the beams to a photonic integrated circuit that can operate on the beams, such as by applying gain. Because the beams have the same polarization state, the photonic integrated circuit can operate on the beams equally, such as applying a particular level of gain to the separate beams. This can overcome any differences in photonic integrated circuit response with respect to polarization state, which might otherwise cause one beam to be affected more than another. After the photonic integrated circuit has performed its function on the separate beams, the same optical coupling device or a different device can direct the beams away from the photonic integrated circuit.

In some examples, the optical coupling device can include multiple grating couplers that are spatially separated from each other. Such spatial separation can allow a dedicated grating coupler to be used for each beam in the device. Compared with using a single grating coupler for multiple beams, using dedicated grating couplers, each operating on just a single beam, can allow for more efficient coupler designs.

In an example, an optical coupling device can include a first birefringent layer having opposing first and second surfaces. The first birefringent layer can split incident light received at the first surface into first and second beams. The first and second beams can have respective polarization orientations that are orthogonal to each other. The first birefringent layer can propagate the first and second beams along respective first and second paths within the first birefringent layer to the second surface. The first and second beams can be spatially separated at the second surface. A redirection layer facing the second surface of the first birefringent layer can include first and second grating couplers configured to respectively redirect the first and second beams to propagate within the redirection layer as respective third and fourth beams. In some examples, the third and fourth beams can have respective polarization orientations that are parallel to each other.

Figure 1:
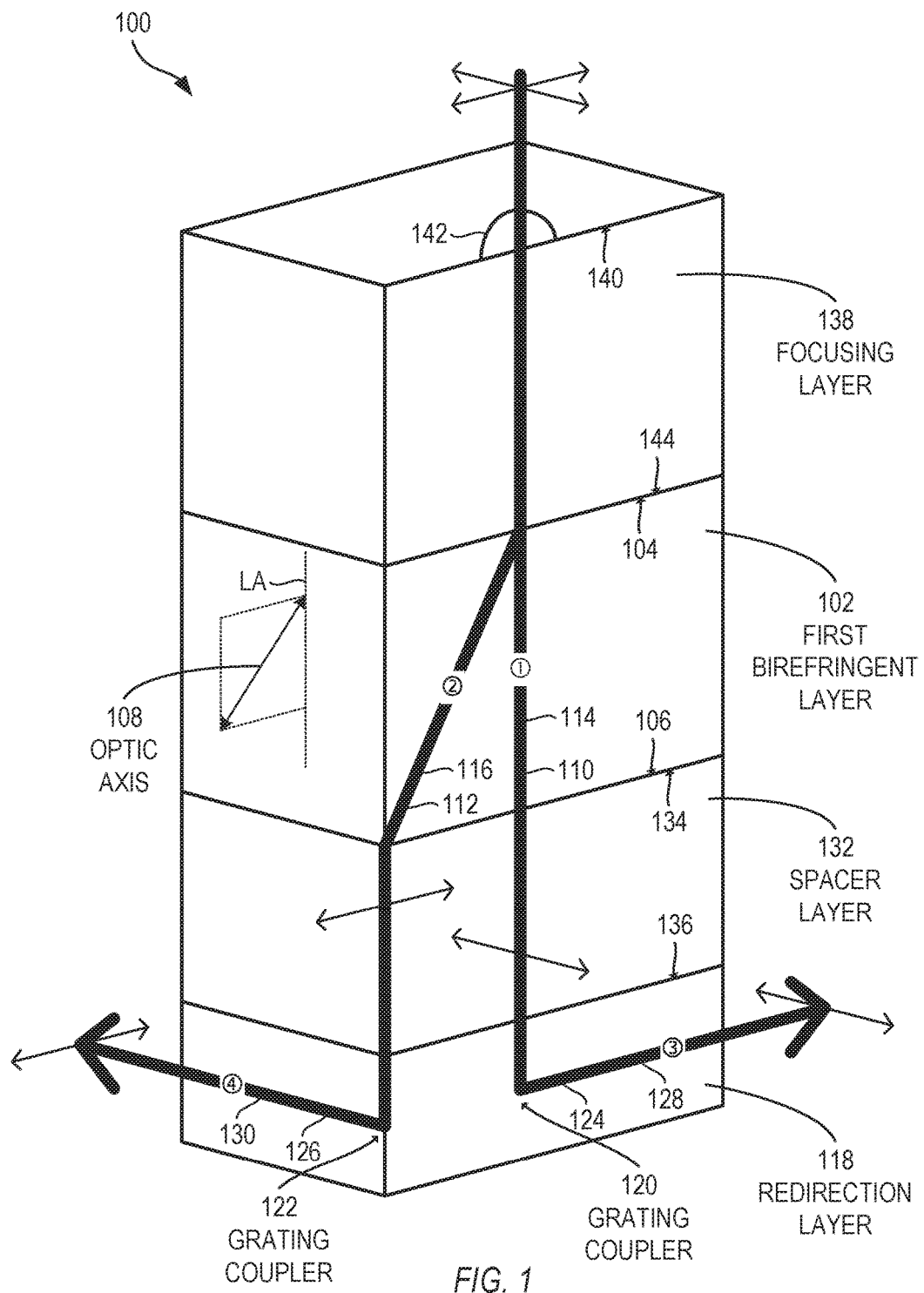
FIG. 1 shows an example of an optical coupling device, in accordance with some embodiments.

FIG. 1 shows an example of an optical coupling device 100, in accordance with some embodiments. Such an optical coupling device 100 can receive light from a light source, split the received light into separate beams having orthogonal polarization states, and direct the separate beams toward respective waveguides using a geometry that orients the polarization states of the directed beams to be coplanar. The optical coupling device 100 of FIG. 1 can also be used in reverse, to combine light from the respective waveguides. The configuration of FIG. 1 is but one example of an optical coupling device 100 that can perform such a function. Other configurations can also be used.

Figure 4:
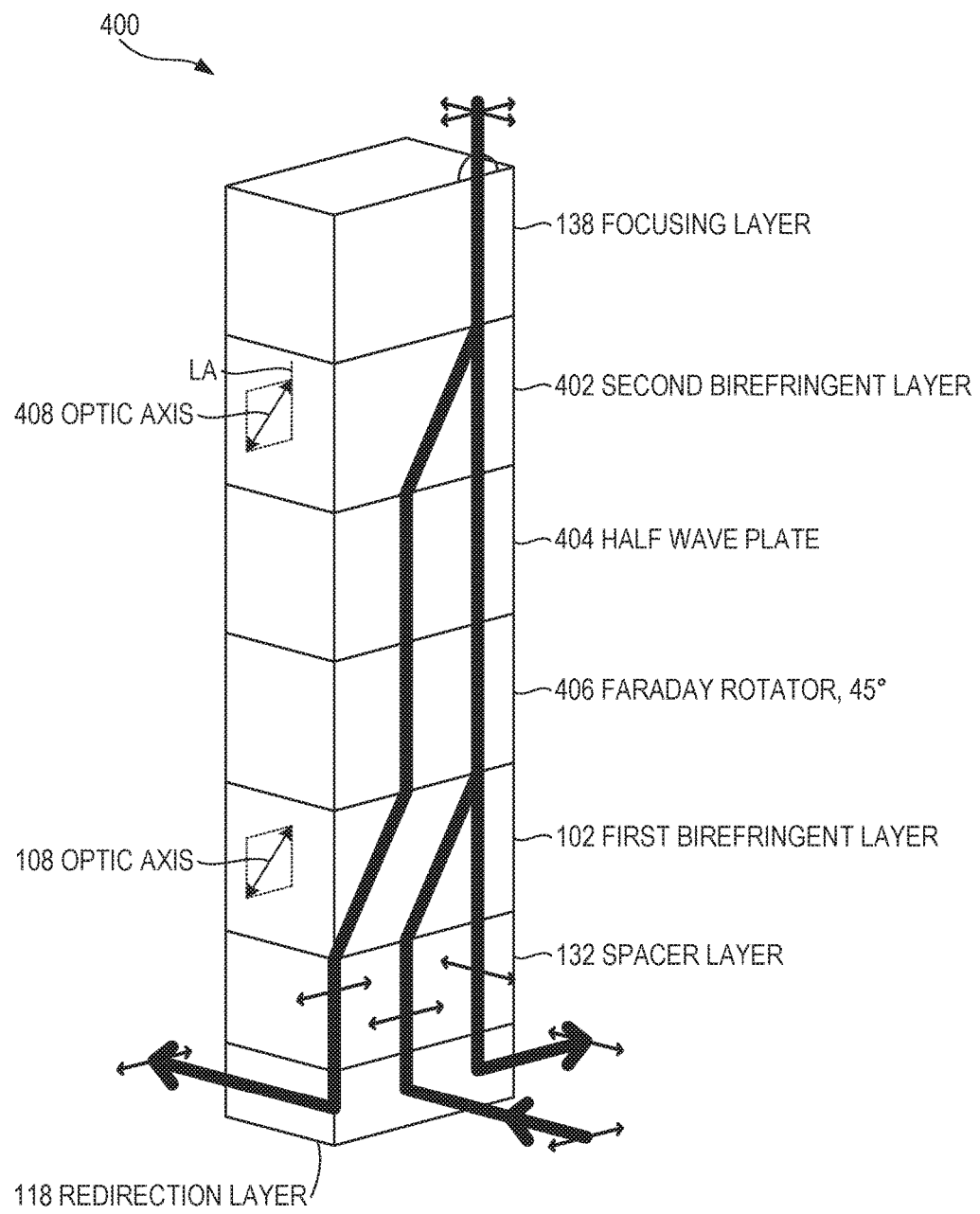
FIG. 4 shows an example of another optical coupling device, in accordance with some embodiments.
Figure 5:
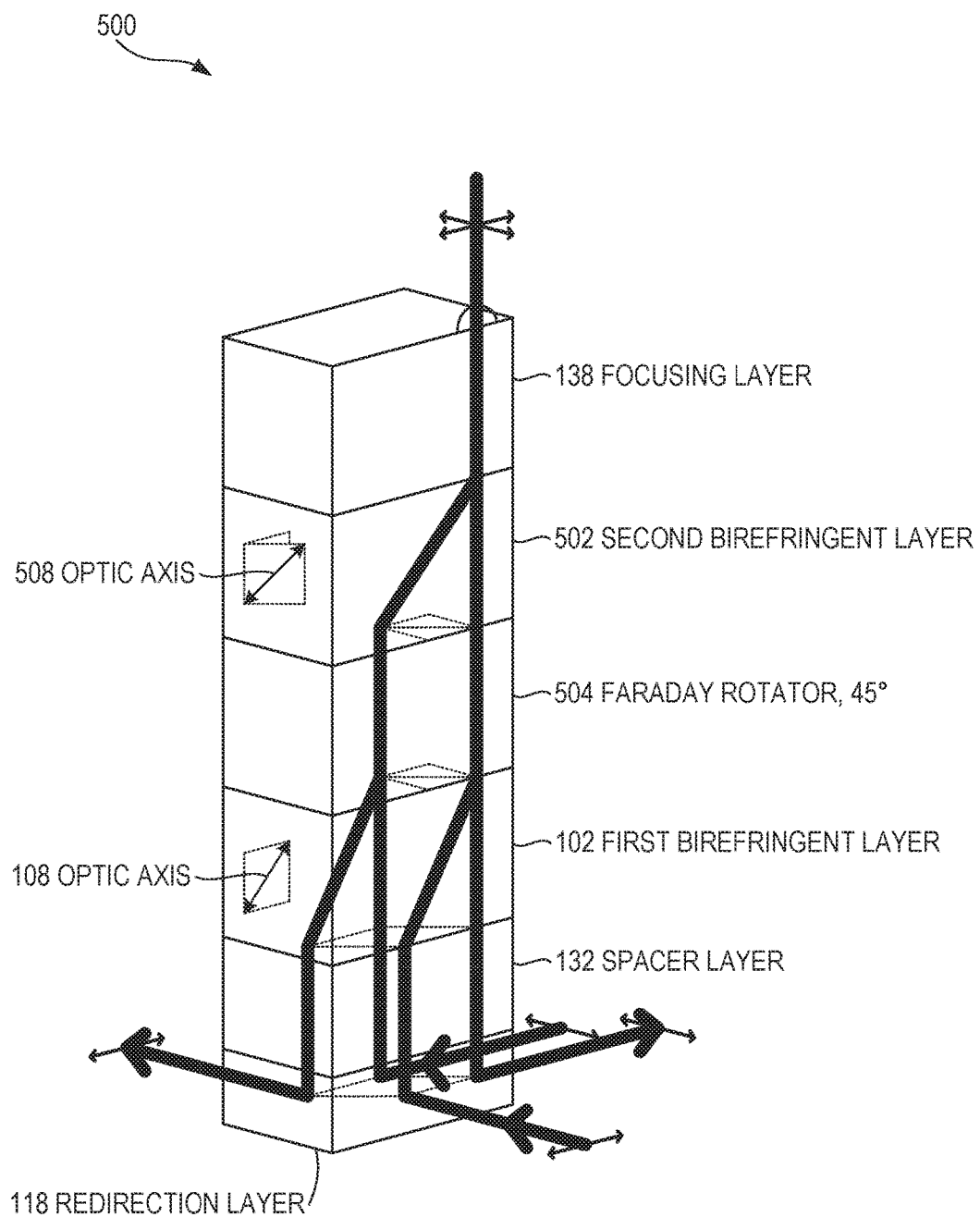
FIG. 5 shows an example of another optical coupling device, in accordance with some embodiments.

FIG. 1 shows an edge view of a layered structure, which is cut along the lines on beams that propagate within the layered structure. It will be understood that the cut shown in FIG. 1 is strictly for clarity, and that the actual layers in the layered structure extend laterally beyond the cut shown in FIG. 1. FIGS. 4 and 5, discussed below, also include views with cuts that are shown strictly for clarity.

The optical coupling device 100 can include a first birefringent layer 102 that can separate orthogonal polarization components of a light beam. Separation of the polarization components occurs if the light beam strikes the first birefringent layer 102 at normal incidence (e.g., parallel to a surface normal of the first birefringent layer 102), or if the light beam strikes the first birefringent layer 102 at non-normal incidence (e.g., angled with respect to the surface normal). The first birefringent layer 102 can have opposing first and second surfaces 104, 106. In some examples, the first birefringent layer 102 can define a longitudinal axis (LA) as being orthogonal to the first surface 104.

In some examples, the first birefringent layer 102 can be formed from a material having an optic axis 108 that is angled with respect to the longitudinal axis (LA) by an angle between zero and ninety degrees, non-inclusive. In some examples, the optic axis 108 can be angled at forty-five degrees with respect to the longitudinal axis (LA). The forty-five degree angular orientation of the optic axis 108 is a relatively common crystal cut for birefringent materials. Other angular orientations can also be used.

The first birefringent layer 102 can split incident light received at the first surface 104 into a first beam 110 and a second beam 112, corresponding to an ordinary ray and an extraordinary ray. The first and second beams 110, 112 can have respective polarization orientations that are orthogonal to each other. The ordinary ray can have a polarization state orthogonal to a plane formed by the optic axis 108 and the longitudinal axis (LA). The extraordinary ray can have a polarization state orthogonal to both the polarization state of the ordinary ray and the propagation direction of the extraordinary ray. The polarization state of the extraordinary ray can lie within the plane formed by the optic axis 108 and the longitudinal axis (LA).

The first birefringent layer 102 can propagate the first and second beams 110, 112 along respective first and second paths 114, 116 within the first birefringent layer 102 to the second surface 106. For ease of reference, the first and second paths 114, 116 are labeled in FIG. 1 with circled numerals 1 and 2, respectively. The first and second paths 114, 116 can be angled with respect to each other. For an incident light beam that is orthogonal to the first surface 104 of the first birefringent layer 102, the ordinary ray can continue on the same path as the incident light beam, while the extraordinary ray can angularly deflect toward or away from the optic axis 108. For positive uniaxial birefringent materials, such as rutile, the extraordinary ray angularly deflects toward the optic axis 108. For negative uniaxial birefringent materials, such as calcite and lithium niobate, the extraordinary ray angularly deflects away from the optic axis 108. In FIG. 1 and subsequent figures, the first birefringent layer 102 and any additional birefringent layers are formed from one or more positive uniaxial materials. It will be understood that negative uniaxial materials can alternatively be used for any or all of these birefringent layers. For both positive uniaxial materials and negative uniaxial materials, the angular deflection lies in the plane formed by the optic axis 108 and a longitudinal axis (LA) that is orthogonal to the first surface 104 of the first birefringent layer 102. The first and second beams 110, 112 can have a spatial separation at the second surface 106.

In some examples, the first birefringent layer 102 can include calcite, which has a relatively large birefringence. In some examples, the first birefringent layer 102 can include calcite or lithium niobate, which are typically available in a wafer format from which pieces can be singulated to form the layered structure. In some examples, the first birefringent layer 102 can include rutile, which is also typically available in wafers, and can optionally be deposited directly on a wafer of a photonic integrated circuit.

Figure 2:
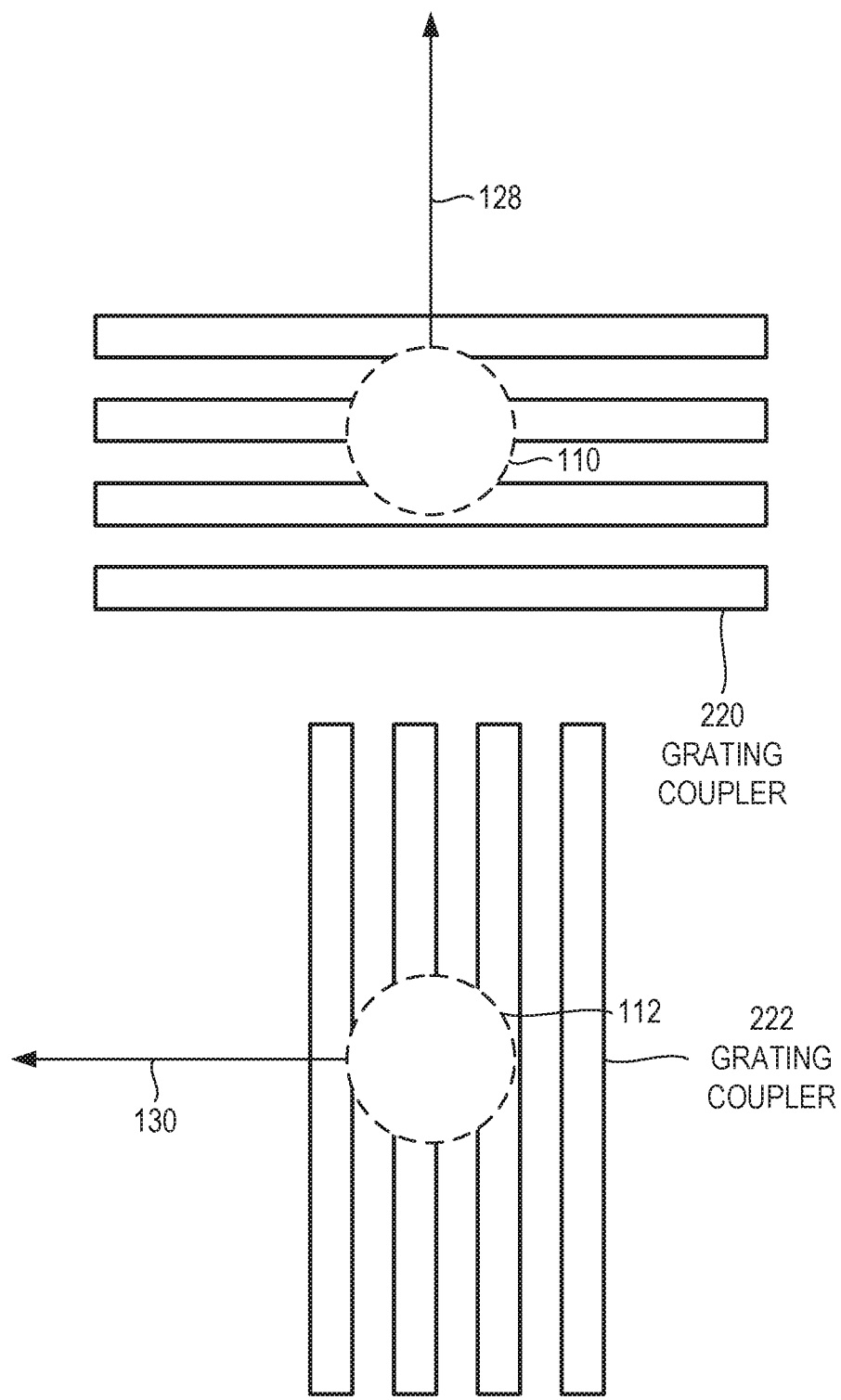
FIG. 2 shows an example of first and second grating couplers, in accordance with some embodiments.
Figure 3:
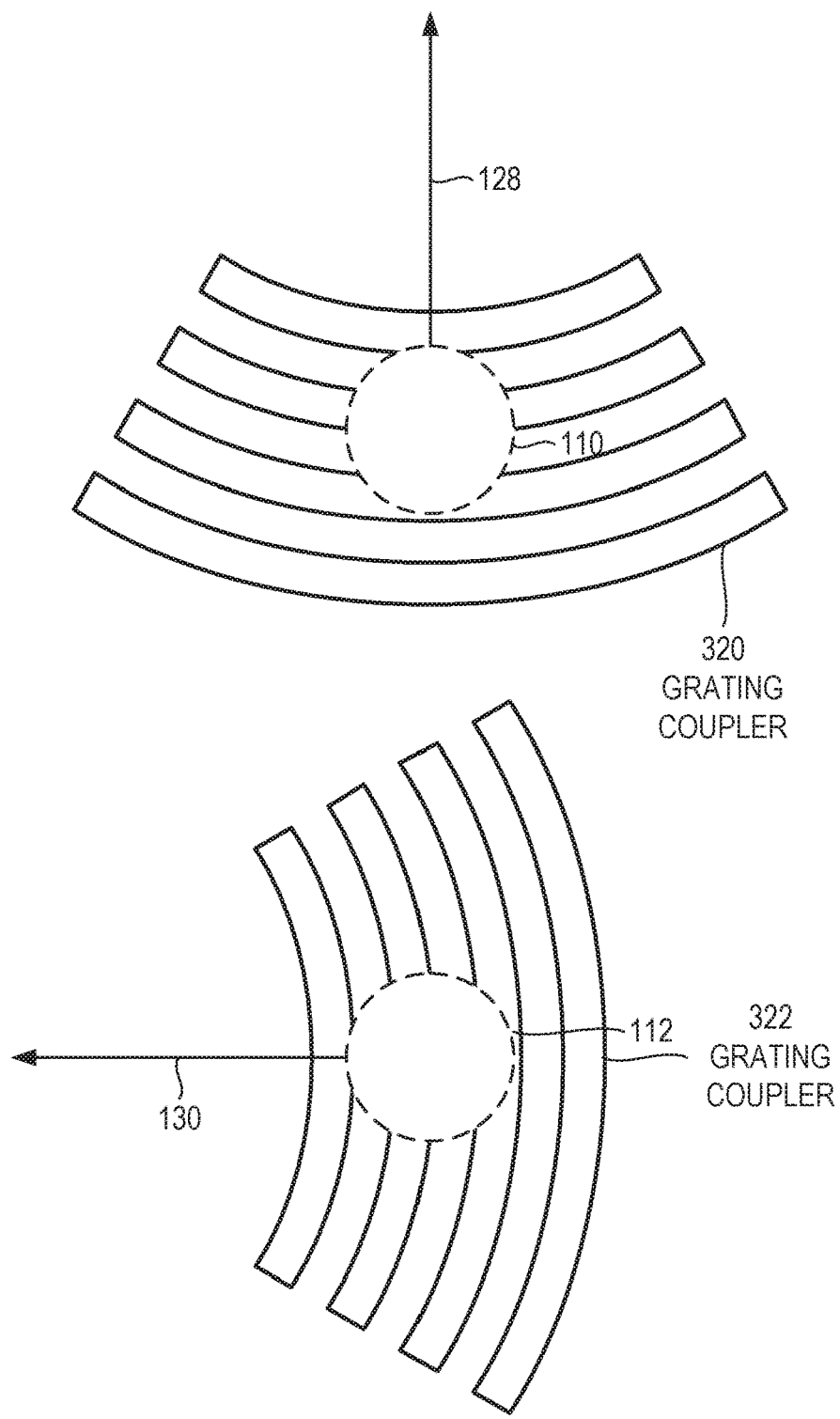
FIG. 3 shows another example of first and second grating couplers, in accordance with some embodiments.

The optical coupling device 100 can further include a redirection layer 118 facing the second surface 106 of the first birefringent layer 102. The redirection layer 118 can include first and second grating couplers 120, 122. In some examples, the first and second grating couplers 120, 122 can each include a respective region in which a refractive index varies periodically. FIGS. 2 and 3, discussed below in further detail, show specific examples of first and second grating couplers 120, 122.

In some examples, either or both of the first and second grating couplers 120, 122 can be disposed on a surface of the redirection layer 118, such on a top surface or a bottom surface of the redirection layer 118. In some examples, either or both of the first and second grating couplers 120, 122 can be disposed in a volume of the redirection layer 118, between the top and bottom surfaces of the redirection layer 118.

In some examples, the first and second grating couplers 120, 122 can be spatially separated. In some examples, the first and second grating couplers 120, 122 can have a separation that matches a separation of the first and second beams 110, 112 at the second surface 106 of the first birefringent layer 102.

The first and second grating couplers 120, 122 can respectively redirect the first and second beams 110, 112 to propagate within the redirection layer 118 as respective third and fourth beams 124, 126 along respective third and fourth paths 128, 130. For ease of reference, the third and fourth paths 128, 130 are labeled in FIG. 1 with circled numerals 3 and 4, respectively. The third and fourth paths 128, 130 can be angled with respect to each other. In some examples, the third and fourth paths 128, 130 can be oriented orthogonal to the periodic variations of the first and second regions, respectively.

In some examples, the third and fourth beams 124, 126 can have respective polarization orientations that are coplanar. In some examples, the third and fourth beams 124, 126 can have respective polarization orientations that are parallel to the second surface 106 of the first birefringent layer 102.

In some examples, the third and fourth beams 124, 126 can have respective polarization orientations that are perpendicular to the second surface 106 of the first birefringent layer 102. For these examples, the first grating coupler 120 can redirect the first beam 110 within a plane formed by the optic axis 108 of the first birefringent layer 102 and a longitudinal axis (LA) that is orthogonal to the first surface 104 of the first birefringent layer 102. For these examples, the second grating coupler 122 can redirect the second beam 112 orthogonal to the plane formed by the optic axis 108 and the longitudinal axis (LA).

In other examples (not shown in FIG. 1), the third and fourth beams 124, 126 can have respective polarization orientations that are parallel to the second surface 106 of the first birefringent layer 102. For these examples, the grating coupler can redirect the first beam 110 orthogonal to the plane formed by the optic axis 108 and the longitudinal axis (LA). For these examples, the grating coupler can redirect the second beam 112 within the plane formed by the optic axis 108 and the longitudinal axis (LA).

In some examples, the optical coupling device 100 can further include an optional spacer layer 132 positioned between the first birefringent layer 102 and the redirection layer 118. In some examples, the spacer layer 132 can be formed as a substrate, upon which a photonic integrated circuit can be formed. In some examples, the spacer layer 132 can be formed from an isotropic (e.g., non-birefringent) material. In some examples, the spacer layer 132 can have a first surface 134 that contacts the second surface 106 of the first birefringent layer 102. In some examples, the spacer layer 132 can have a second surface 136, opposite the first surface 134, which contacts the redirection layer 118.

In some examples, the optical coupling device 100 can be configured to couple light from an optical fiber to one or more waveguides. Such an optical fiber is not shown in FIG. 1, but would be positioned at the top of the figure, oriented vertically, and emitting light into the optical coupling device 100. In some examples, the light emitted from the optical fiber can have a central axis that is parallel to the longitudinal axis (LA). In other examples, the light emitted from the optical fiber can have a central axis that is angled with respect to the longitudinal axis (LA). Similarly, the waveguides are not shown in FIG. 1, but would be positioned on or within the redirection layer 118, and oriented parallel to the redirection layer 118. Such coupling can be improved by using one or more elements in or on the optical coupling device 100 that change the collimation of the light.

In some examples, the optical coupling device 100 can optionally include a focusing layer 138 facing the first surface 104 of the first birefringent layer 102. The focusing layer 138 can impart a convergence onto the incident light to focus the third and fourth beams 124, 126 onto longitudinal ends of first and second waveguides, respectively. The convergence can impart a mode shape that efficiently couples the energy into waveguide modes, along the third and fourth paths 128, 130. In some examples, the focusing layer 138 can include a first surface 140 that includes one or more curved features 142, and a second surface 144 contacting the first surface 104 of the first birefringent layer 102.

In some examples, the focusing layer 138 can include a lens. The lens can include optically isotropic materials, such as silica or air. The lens can include one or more surfaces. Each surface can have zero curvature (e.g., flat) or a finite curvature. In some examples, the lens can be attached directly to a photonic integrated circuit, either on a substrate surface or on a surface that includes waveguides. In some examples, a lens surface can be external to the photonic integrated circuit, separated by an air gap. In some examples, birefringent material can be attached directly to the photonic integrated circuit. In some examples, the lens and the birefringent material can be attached to one another but separated from the photonic integrated circuit by an air gap. In some examples, the lens can be attached to the birefringent material, which is attached to the photonic integrated circuit.

For configurations in which a focusing layer 138 is present, the first and second grating couplers 120, 122 can redirect the light beams without changing the convergence of the light beams. FIG. 2 shows an example of first and second grating couplers 220, 222, in accordance with some embodiments. The first and second grating couplers 220, 222 can each include a respective region in which a refractive index varies periodically. The regions can be sized larger than respective footprints of the first and second beams 110, 112. The periodic variations of the first and second regions can be oriented orthogonal to the third and fourth paths 128, 130, respectively.

In the configuration of FIG. 2, in which the first and second grating couplers 220, 222 redirect light but do not change the convergence of the light, the periodic variations in the first and second regions can be linear in shape.

For configurations in which a focusing layer 138 is absent, and some configuration in which the focusing layer 138 is present, the grating couplers can additionally impart a convergence onto the redirected light. FIG. 3 shows another example of first and second grating couplers 320, 322, in accordance with some embodiments. The first and second grating couplers 320, 322 can each include a respective region in which a refractive index varies periodically. The periodic variations of the first and second regions can be oriented orthogonal to the third and fourth paths 128, 130, respectively.

In contrast with the grating couplers of FIG. 2, the first and second grating couplers 320, 322 of FIG. 3 can include first and second regions that include periodic variations that are curved in shape. The periodic variations can curve toward the third and fourth paths 128, 130, respectively. Such curvature can impart the convergence onto the third and fourth beams 124, 126 along respective third and fourth paths 128, 130, so that the third and fourth beams 124, 126 can couple into first and second waveguides, respectively. The curvature can focus the third and fourth beams 124, 126 onto longitudinal ends of first and second waveguides, respectively.

FIG. 4 shows an example of another optical coupling device 400, in accordance with some embodiments. Such an optical coupling device 400 can receive light from a light source, split the received light into separate beams having orthogonal polarization states, and direct the separate beams toward respective waveguides using a geometry that orients the polarization states of the directed beams to be coplanar. In addition, the optical coupling device 400 of FIG. 4, when used in reverse, can direct light from a third waveguide toward the light source. In this manner, the device of FIG. 4 can function as a combination polarization separator/optical circulator. The configuration of FIG. 4 is but one example of a combination polarization separator/optical circulator. Other configurations can also be used.

The optical coupling device 400 can include a first birefringent layer 102 having opposing first and second surfaces. The first birefringent layer 102 can split incident light received at the first surface into first and second beams. The first and second beams can have respective polarization orientations that are orthogonal to each other. The first birefringent layer 102 can propagate the first and second beams along respective first and second paths within the first birefringent layer 102 to the second surface. The first and second paths can be angled with respect to each other. The first and second beams can have a spatial separation at the second surface.

The optical coupling device 400 can include a redirection layer 118 facing the second surface of the first birefringent layer 102. The redirection layer 118 can include first and second grating couplers configured to respectively redirect the first and second beams to propagate within the redirection layer 118 as respective third and fourth beams along respective third and fourth paths. The third and fourth paths can be angled with respect to each other.

The first birefringent layer 102, redirection layer 118, optional spacer layer 132, and optional focusing layer 138 can be identical in structure and function to the corresponding elements shown in FIG. 1. Compared with the optical coupling device 100 of FIG. 1, the optical coupling device 400 of FIG. 4 includes additional elements, described below.

The optical coupling device 400 can further include a second birefringent layer 402 having opposing first and second surfaces. The second surface of the second birefringent layer 402 can face the first surface of the first birefringent layer 102. In the configuration shown in FIG. 4, the optic axis 408 of the second birefringent layer 402 is oriented parallel to the optic axis 108 of the first birefringent layer 102. Optionally, the optic axis 408 of the second birefringent layer 402 can be angled with respect to the optic axis 108 of the first birefringent layer 102, which viewed along the longitudinal axis (LA). In some examples, the first birefringent layer 102 and the second birefringent layer 402 can be formed from the same birefringent material. In other examples, the first birefringent layer 102 and the second birefringent layer 402 can be formed from different birefringent materials.

The optical coupling device 400 can further include a half wave plate 404 and a Faraday rotator 406 positioned between the first birefringent layer 102 and the second birefringent layer 402. The Faraday rotator 406 and half wave plate 404 can each be positioned to rotate a plane of polarization by forty-five degrees. For light propagating in one direction, the rotation adds, so that the Faraday rotator 406 and half wave plate 404, combined, rotate the plane of polarization by ninety degrees. For light propagating in an opposite direction, the rotation cancels, so that the Faraday rotator 406 and half wave plate 404, combined, leave the plane of polarization unchanged. To understand the operation of the Faraday rotator 406, it is helpful to consider the rotation direction with respect to direction of propagation. For one direction of propagation, the Faraday rotator 406 rotates the plane of polarization by forty-five degrees using a so-called right hand screw rule. For the opposite direction of propagation, the Faraday rotator 406 rotates the plane of polarization by forty-five degrees using a so-called left hand screw rule.

In some examples, the half wave plate 404 and the Faraday rotator 406 can rotate by ninety degrees a polarization orientation of light propagating from the first birefringent layer 102 to the second birefringent layer 402, but not of light propagating from the second birefringent layer 402 to the first birefringent layer 102.

In other examples, the half wave plate 404 and the Faraday rotator 406 can rotate by ninety degrees a polarization orientation of light propagating from the second birefringent layer 402 to the first birefringent layer 102, but not of light propagating from the first birefringent layer 102 to the second birefringent layer 402.

In the configuration shown in FIG. 4, the half wave plate 404 faces the second birefringent layer 402, and the Faraday rotator 406 faces the first birefringent layer 102. In other configurations, the positions of the half wave plate 404 and the Faraday rotator 406 can be swapped, so that the half wave plate 404 faces the first birefringent layer 102, and the Faraday rotator 406 faces the second birefringent layer 402.

In the configuration of FIG. 4, light for each beam in the redirection layer 118 is polarized parallel to a top surface of the redirection layer 118 (e.g., orthogonal to the longitudinal axis (LA)). Using light that is polarized in a single direction can help reduce or eliminate polarization dependent loss for a photonic integrated circuit that uses the light in the redirection layer 118. In an alternate configuration, light for each beam in the redirection layer 118 can be polarized orthogonal to a top surface of the redirection layer 118 (e.g., parallel to the longitudinal axis (LA)). In still other configurations, other polarization orientations can also be used.

FIG. 5 shows an example of another optical coupling device 500, in accordance with some embodiments. Such an optical coupling device 500 can receive light from a light source, split the received light into separate beams having orthogonal polarization states, and direct the separate beams toward respective waveguides using a geometry that orients the polarization states of the directed beams to be coplanar. In addition, the optical coupling device 500 of FIG. 5, when used in reverse, can direct light from third and fourth waveguides toward the light source. In this manner, the device of FIG. 5 can function as a combination polarization separator/optical circulator. The configuration of FIG. 5 is but one example of a combination polarization separator/optical circulator. Other configurations can also be used.

The optical coupling device 500 can include a first birefringent layer 102 having opposing first and second surfaces. The first birefringent layer 102 can split incident light received at the first surface into first and second beams. The first and second beams can have respective polarization orientations that are orthogonal to each other. The first birefringent layer 102 can propagate the first and second beams along respective first and second paths within the first birefringent layer 102 to the second surface. The first and second paths can be angled with respect to each other. The first and second beams can have a spatial separation at the second surface.

The optical coupling device 500 can include a redirection layer 118 facing the second surface of the first birefringent layer 102. The redirection layer 118 can include first and second grating couplers configured to respectively redirect the first and second beams to propagate within the redirection layer 118 as respective third and fourth beams along respective third and fourth paths. The third and fourth paths can be angled with respect to each other.

The first birefringent layer 102, redirection layer 118, optional spacer layer 132, and optional focusing layer 138 can be identical in structure and function to the corresponding elements shown in FIG. 1. Compared with the optical coupling device 100 of FIG. 1, the optical coupling device 500 of FIG. 5 includes additional elements, described below.

The optical coupling device 500 can further include a second birefringent layer 502 having opposing first and second surfaces. The second surface of the second birefringent layer 502 can face the first surface 104 of the first birefringent layer 102. In some examples, the second birefringent layer 502 can have an optic axis 508 that is angled with respect to the longitudinal axis (LA). In some examples, the second birefringent layer 502 can have an optic axis 508 that is angled at forty-five degrees with respect to the optic axis 108 of the first birefringent layer 102, when viewed along the longitudinal axis (LA).

The optical coupling device 500 can further include a Faraday rotator 504 positioned between the first birefringent layer 102 and the second birefringent layer 502. The Faraday rotator 504 can rotate by forty-five degrees in a first direction a polarization orientation of light propagating from the first birefringent layer 102 to the second birefringent layer 502, and rotate by forty-five degrees, also in the first direction, a polarization orientation of light propagating from the second birefringent layer 502 to the first birefringent layer 102.

In the configuration of FIG. 5, light for each beam in the redirection layer 118 is polarized parallel to a top surface of the redirection layer 118 (e.g., orthogonal to the longitudinal axis (LA)). Using light that is polarized in a single direction can help reduce or eliminate polarization dependent loss for a photonic integrated circuit that uses the light in the redirection layer 118. In an alternate configuration, light for each beam in the redirection layer 118 can be polarized orthogonal to a top surface of the redirection layer 118 (e.g., parallel to the longitudinal axis (LA)). In still other configurations, other polarization orientations can also be used.

Figure 6:
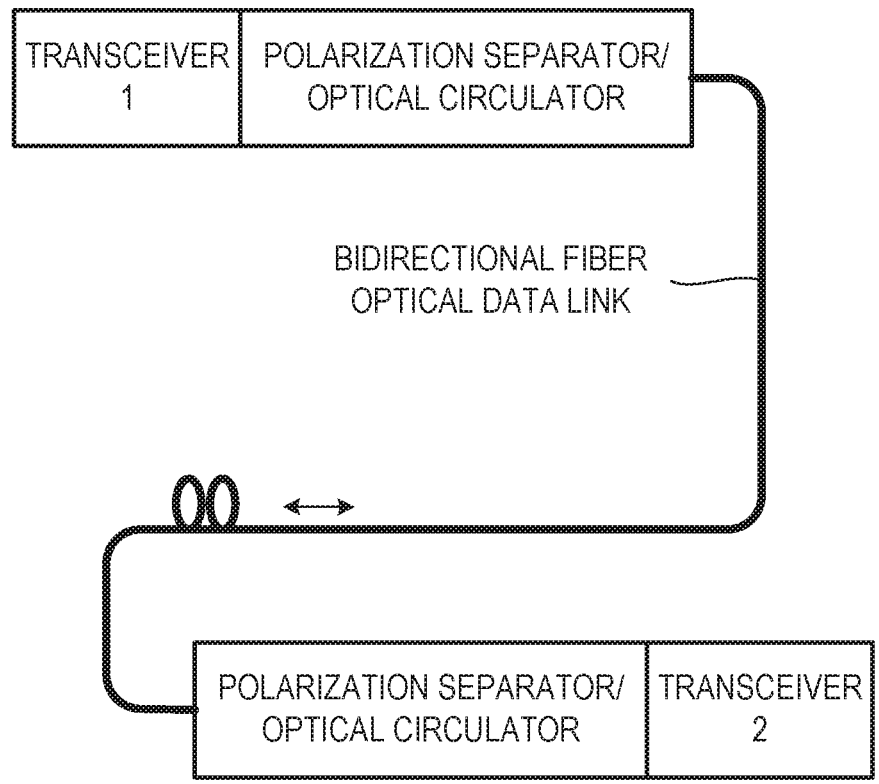
FIG. 6 shows an example of a bidirectional optical link, in accordance with some embodiments.

FIG. 6 shows an example of a bidirectional optical link, in accordance with some embodiments. The bidirectional optical link includes two polarization separator/optical circulator components attached to two transceiver photonic integrated circuits, joined by an optical fiber. Other network architectures can also be used. An advantage to using the components as shown in FIG. 6 is that the optical fiber can direct light traveling in different directions in the fiber to different input and output ports on a photonic integrated circuit. This can reduce or remove crosstalk between the transmitted and received light path on the photonic integrated circuit.

In some examples, one or more grating couplers may be replaced with photodetectors. Such an arrangement would allow the photodetectors to measure the orthogonal polarizations of a polarization-multiplexed signal.

Figure 7:
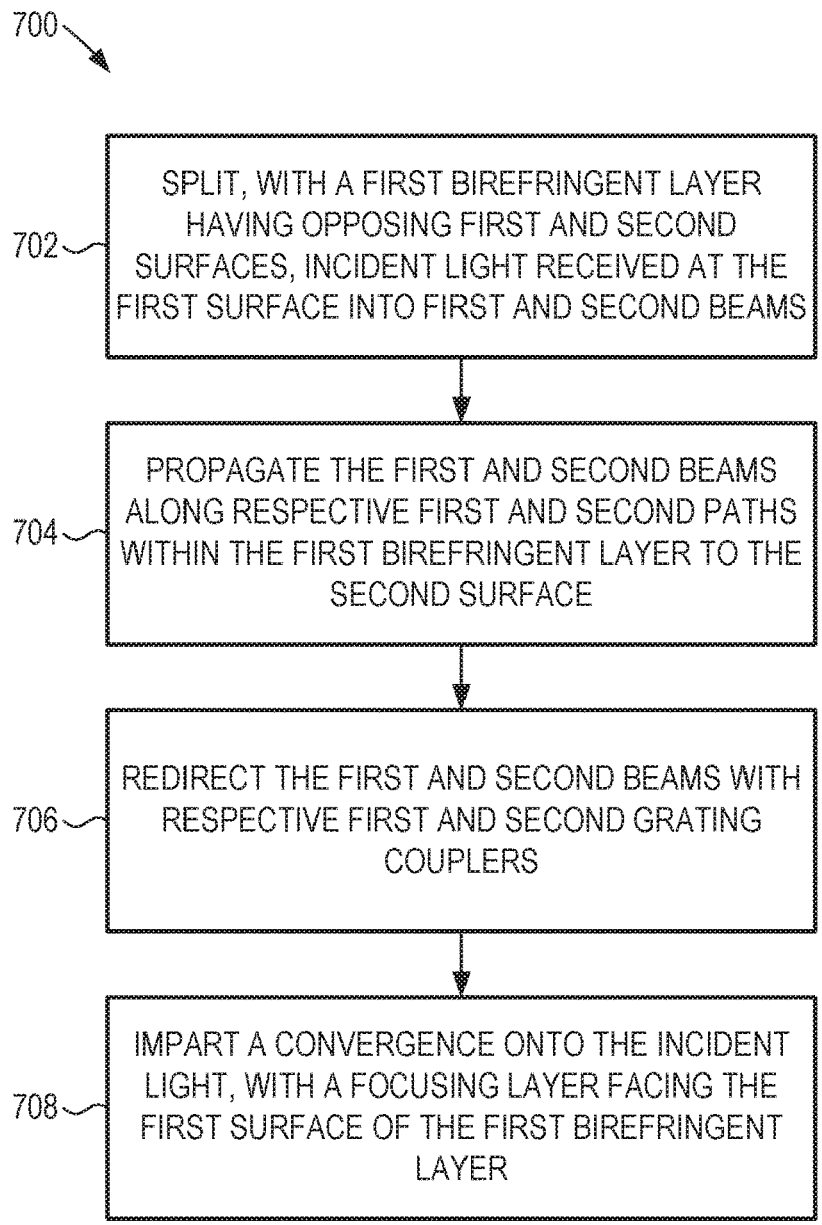
FIG. 7 shows an example of a method of operation, in accordance with some embodiments, for an optical coupling device.

FIG. 7 shows an example of a method of operation, in accordance with some embodiments, for an optical coupling device, such as devices from FIGS. 1, 4, and 5. The method of FIG. 7 is but one example of a method of operation for an optical coupling device. Other suitable methods can also be used.

At operation 702, the optical coupling device can split, with a first birefringent layer having opposing first and second surfaces, incident light received at the first surface into first and second beams. The first and second beams can have respective polarization orientations that are orthogonal to each other.

At operation 704, the optical coupling device can propagate the first and second beams along respective first and second paths within the first birefringent layer to the second surface. The first and second paths can be angled with respect to each other. The first and second beams can have a spatial separation at the second surface.

At operation 706, the optical coupling device can redirect the first and second beams with respective first and second grating couplers. The redirected first and second beams can propagate within a redirection layer facing the second surface of the first birefringent layer. The redirected first and second beams can propagate along respective third and fourth paths. The third and fourth paths can be angled with respect to each other.

At optional operation 708, the optical coupling device can impart a convergence onto the incident light, with a focusing layer facing the first surface of the first birefringent layer, to focus the third and fourth beams onto longitudinal ends of first and second waveguides, respectively.

To further illustrate the device and related method disclosed herein, a non-limiting list of examples is provided below. Each of the following non-limiting examples can stand on its own, or can be combined in any permutation or combination with any one or more of the other examples.

In Example 1, an optical coupling device can include: a first birefringent layer having opposing first and second surfaces, the first birefringent layer configured to: split incident light received at the first surface into first and second beams, the first and second beams having respective polarization orientations that are orthogonal to each other, and propagate the first and second beams along respective first and second paths within the first birefringent layer to the second surface, the first and second paths being angled with respect to each other, the first and second beams having a spatial separation at the second surface; and a redirection layer facing the second surface of the first birefringent layer, the redirection layer including first and second grating couplers configured to respectively redirect the first and second beams to propagate within the redirection layer as respective third and fourth beams along respective third and fourth paths, the third and fourth paths being angled with respect to each other.

In Example 2, the optical coupling device of Example 1 can optionally be configured such that the first and second grating couplers are spatially separated.

In Example 3, the optical coupling device of any one of Examples 1-2 can optionally be configured such that the first grating coupler redirects the first beam within a plane formed by an optic axis of the first birefringent layer and a longitudinal axis that is orthogonal to the first surface of the first birefringent layer; the second grating coupler redirects the second beam orthogonal to the plane formed by the optic axis and the longitudinal axis; and the third and fourth beams have respective polarization orientations that are parallel to the second surface of the first birefringent layer.

In Example 4, the optical coupling device of any one of Examples 1-3 can optionally be configured such that the first and second grating couplers each include a respective region in which a refractive index varies periodically, the periodic variations of the first and second regions being oriented orthogonal to the third and fourth paths, respectively.

In Example 5, the optical coupling device of any one of Examples 1-4 can optionally further include a focusing layer facing the first surface of the first birefringent layer, the focusing layer configured to impart a convergence onto the incident light to focus the third and fourth beams onto longitudinal ends of first and second waveguides, respectively.

In Example 6, the optical coupling device of any one of Examples 1-5 can optionally be configured such that the focusing layer includes a first surface that includes one or more curved features, and a second surface contacting the first surface of the first birefringent layer.

In Example 7, the optical coupling device of any one of Examples 1-6 can optionally be configured such that the first and second grating couplers include respective regions that include periodic variations that are curved in shape, the curvature configured to focus the third and fourth beams onto longitudinal ends of first and second waveguides, respectively.

In Example 8, the optical coupling device of any one of Examples 1-7 can optionally be configured such that the first birefringent layer defines a longitudinal axis as being orthogonal to the first surface; and the first birefringent layer is formed from a material having an optic axis that is angled with respect to the longitudinal axis by an angle between zero and ninety degrees, non-inclusive.

In Example 9, the optical coupling device of any one of Examples 1-8 can optionally be configured such that the optic axis is angled at forty-five degrees with respect to the longitudinal axis.

In Example 10, the optical coupling device of any one of Examples 1-9 can optionally further include a spacer layer positioned between the first birefringent layer and the redirection layer.

In Example 11, the optical coupling device of any one of Examples 1-10 can optionally be configured such that the spacer layer has a first surface that contacts the second surface of the first birefringent layer; and the spacer layer has a second surface, opposite the first surface, that contacts the redirection layer.

In Example 12, the optical coupling device of any one of Examples 1-11 can optionally further include a second birefringent layer having opposing first and second surfaces, the second surface of the second birefringent layer facing the first surface of the first birefringent layer; and a half wave plate and a Faraday rotator positioned between the first birefringent layer and the second birefringent layer.

In Example 13, the optical coupling device of any one of Examples 1-12 can optionally be configured such that the half wave plate and the Faraday rotator are configured to rotate by ninety degrees a polarization orientation of light propagating from the first birefringent layer to the second birefringent layer, but not of light propagating from the second birefringent layer to the first birefringent layer.

In Example 14, the optical coupling device of any one of Examples 1-13 can optionally be configured such that the half wave plate and the Faraday rotator are configured to rotate by ninety degrees a polarization orientation of light propagating from the second birefringent layer to the first birefringent layer, but not of light propagating from the first birefringent layer to the second birefringent layer.

In Example 15, the optical coupling device of any one of Examples 1-14 can optionally further include a second birefringent layer having opposing first and second surfaces, the second surface of the second birefringent layer facing the first surface of the first birefringent layer; and a Faraday rotator positioned between the first birefringent layer and the second birefringent layer.

In Example 16, the optical coupling device of any one of Examples 1-15 can optionally be configured such that the Faraday rotator is configured to: rotate by forty-five degrees in a first direction a polarization orientation of light propagating from the first birefringent layer to the second birefringent layer, and rotate by forty-five degrees in a second direction, opposite the first direction, a polarization orientation alight propagating from the second birefringent layer to the first birefringent layer.

In Example 17, a method can include: splitting, with a first birefringent layer having opposing first and second surfaces, incident light received at the first surface into first and second beams, the first and second beams having respective polarization orientations that are orthogonal to each other; propagating the first and second beams along respective first and second paths within the first birefringent layer to the second surface, the first and second paths being angled with respect to each other, the first and second beams having a spatial separation at the second surface; and redirecting the first and second beams with respective first and second grating couplers, the redirected first and second beams propagating within a redirection layer facing the second surface of the first birefringent layer, the redirected first and second beams propagating along respective third and fourth paths, the third and fourth paths being angled with respect to each other.

In Example 18, the method of Example 17 can optionally further include imparting a convergence onto the incident light, with a focusing layer facing the first surface of the first birefringent layer, to focus the third and fourth beams onto longitudinal ends of first and second waveguides, respectively.

In Example 19, an optical coupling device can include: a first birefringent layer having opposing first and second surfaces, the first birefringent layer configured to: split incident light received at the first surface into first and second beams, the first and second beams having respective polarization orientations that are orthogonal to each other, and propagate the first and second beams along respective first and second paths within the first birefringent layer to the second surface, the first and second paths being angled with respect to each other, the first and second beams having a spatial separation at the second surface; a redirection layer facing the second surface of the first birefringent layer, the redirection layer including spatially separated first and second grating couplers configured to respectively redirect the first and second beams to propagate within the redirection layer as respective third and fourth beams along respective third and fourth paths, the third and fourth paths being angled with respect to each other, the third and fourth beams having respective polarization orientations that are parallel to the second surface of the first birefringent layer; and a focusing layer facing the first surface of the first birefringent layer, the focusing layer configured to impart a convergence onto the incident light to focus the third and fourth beams onto longitudinal ends of first and second waveguides, respectively, the focusing layer including a first surface that includes one or more curved features, and a second surface contacting the first surface of the first birefringent layer.

In Example 20, the optical coupling device of Example 19 can optionally be configured such that the first birefringent layer defines a longitudinal axis as being orthogonal to the first surface; and the first birefringent layer is formed from a material having an optic axis that is angled at forty-five degrees with respect to the longitudinal axis.

What is claimed is:

1. An optical coupling device, comprising:
   a first birefringent layer having opposing first and second surfaces, the first birefringent layer configured to:
   split incident light received at the first surface into first and second beams, the first and second beams having respective polarization orientations that are orthogonal to each other, and
   propagate the first and second beams along respective first and second paths within the first birefringent layer to the second surface, the first and second paths being angled with respect to each other, the first and second beams having a spatial separation at the second surface; and
   a redirection layer facing the second surface of the first birefringent layer, the redirection layer including a first grating coupler configured to redirect the first beam by ninety degrees to propagate within the redirection layer as a third beam along a third path, the redirection layer including a second grating coupler configured to redirect the second beam by ninety degrees to propagate within the redirection layer as a fourth beam along a fourth path, the third and fourth paths being parallel to the second surface of the first birefringent layer and angled with respect to each other.

2. The optical coupling device of claim 1, wherein the first and second grating couplers are spatially separated.

3. The optical coupling device of claim 1, wherein:
   the first grating coupler redirects the first beam within a plane formed by an optic axis of the first birefringent layer and a longitudinal axis that is orthogonal to the first surface of the first birefringent layer;
   the second grating coupler redirects the second beam orthogonal to the plane formed by the optic axis and the longitudinal axis; and
   the third and fourth beams have respective polarization orientations that are parallel to the second surface of the first birefringent layer.

4. The optical coupling device of claim 1, wherein the first and second grating couplers each include a respective region in which a refractive index varies periodically, the periodic variations of the first and second regions being oriented orthogonal to the third and fourth paths, respectively.

5. The optical coupling device of claim 4, further comprising a focusing layer facing the first surface of the first birefringent layer, the focusing layer configured to impart a convergence onto the incident light to focus the third and fourth beams onto longitudinal ends of first and second waveguides, respectively.

6. The optical coupling device of claim 5, wherein the focusing layer includes a first surface that includes one or more curved features, and a second surface contacting the first surface of the first birefringent layer.

7. The optical coupling device of claim 4, wherein the first and second grating couplers include respective regions that include periodic variations that are curved in shape, the curvature configured to focus the third and fourth beams onto longitudinal ends of first and second waveguides, respectively.

8. The optical coupling device of claim 1, wherein:
the first birefringent layer defines a longitudinal axis as being orthogonal to the first surface; and
the first birefringent layer is formed from a material having an optic axis that is angled with respect to the longitudinal axis by an angle between zero and ninety degrees, non-inclusive.

9. The optical coupling device of claim 8, wherein the optic axis is angled at forty-five degrees with respect to the longitudinal axis.

10. The optical coupling device of claim 1, further comprising a spacer layer positioned between the first birefringent layer and the redirection layer.

11. The optical coupling device of claim 10, wherein:
the spacer layer has a first surface that contacts the second surface of the first birefringent layer; and
the spacer layer has a second surface, opposite the first surface, that contacts the redirection layer.

12. The optical coupling device of claim 1, further comprising:
a second birefringent layer having opposing first and second surfaces, the second surface of the second birefringent layer facing the first surface of the first birefringent layer; and
a half wave plate and a Faraday rotator positioned between the first birefringent layer and the second birefringent layer.

13. The optical coupling device of claim 12, wherein the half wave plate and the Faraday rotator are configured to rotate by ninety degrees a polarization orientation of light propagating from the first birefringent layer to the second birefringent layer, but not of light propagating from the second birefringent layer to the first birefringent layer.

14. The optical coupling device of claim 12, wherein the half wave plate and the Faraday rotator are configured to rotate by ninety degrees a polarization orientation of light propagating from the second birefringent layer to the first birefringent layer, but not of light propagating from the first birefringent layer to the second birefringent layer.

15. The optical coupling device of claim 1, further comprising:
a second birefringent layer having opposing first and second surfaces, the second surface of the second birefringent layer facing the first surface of the first birefringent layer; and
a Faraday rotator positioned between the first birefringent layer and the second birefringent layer.

16. The optical coupling device of claim 15, wherein the Faraday rotator is configured to:
rotate by forty-five degrees in a first direction a polarization orientation of light propagating from the first birefringent layer to the second birefringent layer, and
rotate by forty-five degrees in a second direction, opposite the first direction, a polarization orientation of light propagating from the second birefringent layer to the first birefringent layer.

17. A method, comprising:
splitting, with a first birefringent layer having opposing first and second surfaces, incident light received at the first surface into first and second beams, the first and second beams having respective polarization orientations that are orthogonal to each other;
propagating the first and second beams along respective first and second paths within the first birefringent layer to the second surface, the first and second paths being angled with respect to each other, the first and second beams having a spatial separation at the second surface;
redirecting, with a first grating coupler, the first beam by ninety degrees to propagate within a redirection layer facing the second surface of the first birefringent layer, the redirected first beam propagating along a third path; and
redirecting, with a second grating coupler, the second beam by ninety degrees to propagate within the redirection layer, the redirected second beam propagating along a fourth path, the third and fourth paths being angled with respect to each other.

18. The method of claim 17, further comprising imparting a convergence onto the incident light, with a focusing layer facing the first surface of the first birefringent layer, to focus the third and fourth beams onto longitudinal ends of first and second waveguides, respectively.

19. An optical coupling device, comprising:
a first birefringent layer having opposing first and second surfaces, the first birefringent layer configured to:
split incident light received at the first surface into first and second beams, the first and second beams having respective polarization orientations that are orthogonal to each other, and
propagate the first and second beams along respective first and second paths within the first birefringent layer to the second surface, the first and second paths being angled with respect to each other, the first and second beams having a spatial separation at the second surface;
a redirection layer facing the second surface of the first birefringent layer, the redirection layer including a first grating coupler configured to redirect the first beam by ninety degrees to propagate within the redirection layer as a third beam along a third path, the redirection layer including a second grating coupler spatially separated from the first grating coupler and configured to redirect the second beam by ninety degrees to propagate within the redirection layer as a fourth beam along a fourth path, the third and fourth paths being parallel to the second surface of the first birefringent layer and angled with respect to each other, the third and fourth beams having respective polarization orientations that are parallel to the second surface of the first birefringent layer; and
a focusing layer facing the first surface of the first birefringent layer, the focusing layer configured to impart a convergence onto the incident light to focus the third and fourth beams onto longitudinal ends of first and second waveguides, respectively, the focusing layer including a first surface that includes one or more curved features, and a second surface contacting the first surface of the first birefringent layer.

20. The optical coupling device of claim 19, wherein:
the first birefringent layer defines a longitudinal axis as being orthogonal to the first surface; and
the first birefringent layer is formed from a material having an optic axis that is angled at forty-five degrees with respect to the longitudinal axis.

* * * * *